US012709658B2

(12) United States Patent
Cobb et al.

(10) Patent No.: US 12,709,658 B2
(45) Date of Patent: Aug. 18, 2026

(54) CURING AGENTS FOR FLUOROELASTOMERS

(71) Applicant: DUPONT SPECIALTY PRODUCTS USA LLC, Wilmington, DE (US)

(72) Inventors: Michael W. Cobb, Wilmington, DE (US); Anilkumar Raghavanpillai, Wilmington, DE (US); Shuhong Wang, Hockessin, DE (US)

(73) Assignee: Kalrez USA, LLC, Wilmington, DE (US)

( * ) Notice: Subject to any disclaimer, the term of this patent is extended or adjusted under 35 U.S.C. 154(b) by 427 days.

(21) Appl. No.: 18/547,944

(22) PCT Filed: Feb. 25, 2022

(86) PCT No.: PCT/US2022/017885
§ 371 (c)(1),
(2) Date: Aug. 25, 2023

(87) PCT Pub. No.: WO2022/192006
PCT Pub. Date: Sep. 15, 2022

(65) Prior Publication Data

US 2024/0150506 A1 May 9, 2024

Related U.S. Application Data

(60) Provisional application No. 63/158,279, filed on Mar. 8, 2021.

(51) Int. Cl.
*C08F 214/26* (2006.01)

(52) U.S. Cl.
CPC ................................ *C08F 214/262* (2013.01)

(58) Field of Classification Search
CPC .... C08F 214/262; C08F 2810/20; C08F 8/00; C08F 214/26; C08K 3/04; C08K 5/20; C08K 5/29; C08K 5/3417; C08K 5/0025; C08K 5/31; C09K 3/1009
See application file for complete search history.

(56) References Cited

U.S. PATENT DOCUMENTS

| | | | |
|---|---|---|---|
| 4,676,922 A | 6/1987 | Sommer | |
| 5,565,512 A | 10/1996 | Saito et al. | |
| 6,281,296 B1 | 8/2001 | MacLachlan et al. | |
| 6,638,999 B2 | 10/2003 | Bish et al. | |
| 7,521,510 B2 | 4/2009 | Aufdermarsh et al. | |
| 8,318,850 B2 | 11/2012 | Wang | |
| 8,722,780 B2 | 5/2014 | Shimizu et al. | |
| 9,908,992 B2 | 3/2018 | Fox et al. | |
| 2008/0021148 A1 | 1/2008 | Adair et al. | |
| 2008/0116603 A1 | 5/2008 | Grootaert et al. | |
| 2009/0221758 A1 * | 9/2009 | Shimizu ................. | C08K 5/092 525/326.3 |
| 2013/0072656 A1 | 3/2013 | Bish et al. | |
| 2017/0088693 A1 | 3/2017 | Fox et al. | |

OTHER PUBLICATIONS

Selvakumar (R. Selvakumar et al, Journal of Physics and Chemistry of Solids, vol. 86, 2015, 49-56).*
Examination Report of relevant TW Patent Application No. 111108214 dated Nov. 6, 2025.
English translation of OA for relevant JP Patent Application No. 2023-555132 dated Jan. 6, 2026.
Rajendran Selvakumar et al., Journal of Physics and Chemistry of Solids, vol. 86, Jun. 11, 2015 (Jun. 11, 2015), pp. 49-56.
English translation of OA for relevant JP Patent Application No. 2023-555132.

* cited by examiner

*Primary Examiner* — Kumar R Bhushan

(57) ABSTRACT

Provided herein are curable fluoroelastomer compounds comprising a fluoroelastomer and a curing agent. The curing agent comprises an amidocarboxylic acid and an amidine-containing molecule or a salt that is the product of a reaction between an amidocarboxylic acid and an amidine-containing molecule. Further provided are articles comprising the curable fluoroelastomer compounds or a product of curing the fluoroelastomer compounds; processes for curing the compounds; and processes for making the articles.

20 Claims, No Drawings

CURING AGENTS FOR FLUOROELASTOMERS

CROSS REFERENCE TO RELATED APPLICATIONS

This application is a U.S. national stage filing under 35 U.S.C. § 371 of PCT Application No. PCT/US22/017885, filed 25 Feb. 2022, currently pending, which claims the benefit of U.S. Patent Application No. 63/158,279, filed 8 Mar. 2021, under 35 U.S.C. § 119 (e). PCT Application No. PCT/US22/017885, and U.S. Patent Application No. 63/158,279 are hereby incorporated by reference.

FIELD OF THE INVENTION

Described herein are curing agents for use in compounds (also called curable compositions) and expressly including compounds comprising a perfluoroelastomer, and articles cured from these compounds.

BACKGROUND OF THE INVENTION

Several patents, patent applications and publications are cited in this description in order to more fully describe the state of the art to which this invention pertains. The entire disclosure of each of these patents, patent applications and publications is incorporated by reference herein.

Elastomer compounds that comprise a fluoroelastomer have achieved outstanding commercial success because they can be used in severe environments, in particular, during exposure to high temperatures and to aggressive chemicals and plasmas. For example, these compounds are used in seals in wafer manufacturing equipment, in aircraft engines, in oil-well drilling devices, and as sealing elements in industrial equipment that operate at high temperatures and aggressive chemicals.

The properties of cured elastomer compounds arise largely because of the stability and inertness of the copolymerized monomers that make up the major portion of the polymeric backbone of these compounds. Such monomers include tetrafluoroethylene and perfluoro(alkyl vinyl) ethers. In order to develop elastomeric properties fully, elastomer compounds are typically crosslinked, i.e., vulcanized or cured. To this end, a small percentage of cure site monomer is copolymerized with the monomers (whether fluorinated or perfluorinated). Upon crosslinking, the cure site monomer reacts with a curing agent to form a crosslinked elastomer entity in the form of an article.

Curing agents for fluoroelastomers and cured fluoroelastomers are described in US2017/0088693A, in which the curing agent is selected from 1,3-diiminoisoindoline or derivatives thereof. Cured fluoroelastomers formed by these curing agents are useful as seals and gaskets for high temperature and reactive plasma contexts, because the curing agents create a more efficient crosslink that is thermally and chemically stable.

1,3-Diiminoisoindoline and its derivatives are excellent curing agents which provide cured fluoroelastomers with higher thermal stability, compound stability during process such as milling, extrusion and bin stability. Open time at curing temperature ("scorch" or "scorch time") may not be sufficiently long with these curing agents, however. Longer scorch time contributes better processability for manufacturing process. Therefore, it is desired to develop a curing agent with longer scorch, which can form cured fluoroelastomers with higher thermal stability.

U.S. Pat. No. 4,676,922 describes phthalic acid, phthalic anhydride, tetrahydrophthalic anhydride or mixtures thereof as anti-scorch agents for sulfur and N-cyclohexyl-2-benzothiazolesulfenamide (an accelerator). U.S. Pat. No. 8,318,850 describes various curing agents such as bis(aminophenols), aromatic tetraamines, ammonia generating compounds such as urea, guanidines and amidines. U.S. Pat. No. 5,565,512 describes ammonium salts of organic or inorganic acids as curing agents for compounds. U.S. Pat. No. 6,281,296, describes components that are capable of generating ammonia as a curing agent for nitrile-containing fluoroelastomers. These approaches are not sufficient, however, to provide cured fluoroelastomers with higher thermal stability when the curing agent is 1,3-diiminoisoindoline or its derivatives.

Accordingly, a need remains for curing agents for these compounds, which provide cured fluoroelastomers with superior performance at higher temperature, as well as longer scorch during processing. A further need remains for articles produced from these compounds as well as methods for making the compounds and articles.

SUMMARY OF THE INVENTION

Provided herein is a compound comprising one or more fluoroelastomers comprising copolymerized units of one or more unsaturated fluorinated olefins; a second, different unsaturated olefin co-monomer selected from the group consisting of fluorovinyl ethers, fluorinated olefins, hydrocarbon olefins, and mixtures of two or more of these; and one or more cure site monomers selected from the group consisting of nitrile-containing fluorinated olefins and nitrile-containing fluorinated vinyl ethers. The compound further comprises a curing agent that comprises an amidocarboxylic acid and a molecule that comprises an amidine moiety, or the amidocarboxylic acid salt of a molecule that comprises an amidine moiety. Further provided are articles comprising the compound; articles comprising a product of curing the compound; and methods of making the compounds and the articles.

DETAILED DESCRIPTION OF THE INVENTION

Abbreviations

The following abbreviations, as used herein, have the definitions set forth below.

"h", "hr", and "hrs" refer to hours.

"%" refers to a percentage.

"mole %" and "mol %" refer to mole percent.

"wt %" refers to weight percent.

"parts" refers to parts by weight.

"phr" refers to parts per hundred parts of fluoroelastomer (rubber); one of skill in the art uses and recognizes this term of measurement. For example, 3 parts of a component per 100 parts fluoroelastomer is written as 3 phr. In the compounds, processes, and articles described herein, phr is based on 100 parts of fluoroelastomer A.

"g" refers to grams

"Ph" refers to a phenyl group.

Definitions

Unless otherwise defined, all technical and scientific terms used herein have the same meaning as commonly understood by one of ordinary skill in the art to which this invention belongs. Although methods and materials similar or equivalent to those described herein can be used in the practice or testing of the present embodiments, suitable methods and materials are described below. The materials, methods, and Examples described herein are illustrative only and not intended to be limiting.

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. When an article is unfinished, the term "preform" may refer to that form, shape, configuration, any part of which may undergo further processing to become finished. The further processing may include one or more chemical processes, such as curing, or one or more physical processes, such as trimming, sanding, or otherwise shaping.

As used herein, when an article is finished, it is an item, thing, object, element, device, etc. that is in a form, shape, configuration that is suitable for a particular use/purpose without further processing of the entire article or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the terms "comprises," "comprising," "includes," "including," "has," "having" or any other variation of these, refer to a non-exclusive inclusion. For example, a process, method, article, or apparatus that comprises a list of elements is not limited to only the listed elements but may include other elements not expressly listed or inherent.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format." Where an invention or a portion thereof is described with an open-ended term such as "comprising," it is to be understood that, unless otherwise stated in specific circumstances, this description also includes a description of the invention using the terms "consisting of" and "consisting essentially of".

Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. The terms "unit", "repeat unit", and "residue" are synonymous and used interchangeably herein with respect to the constituent comonomers of a copolymer. It follows as a corollary that a copolymer is not the product of a reaction mixture containing given comonomers in given amounts, unless expressly stated in limited circumstances to be such.

As used herein, the term "fluorinated olefin" refers to linear, branched, or cyclic hydrocarbon structures that comprise at least one carbon-carbon double bond and further comprise at least one fluorine atom.

As used herein, the term "alkyl" refers to linear, branched, or cyclic hydrocarbon structures and combinations of there. The term "alkyl" does not include unsaturated moieties, for example vinyl groups or aromatic structures. Examples of linear alkyl groups include, without limitation, methyl, ethyl, propyl, butyl, pentyl, and hexyl groups. Branched alkyl groups include for example without limitation, s- and t-butyl, and isopropyl groups. Examples of cyclic hydrocarbon groups include, without limitation, cyclopropyl, cyclopentyl, cyclohexyl, cyclobutyl, and cyclooctyl groups. As used herein, the term "fluorinated olefin" refers to linear, branched, or cyclic carbon structures that comprise at least one carbon-carbon double bond and at least one fluorine atom.

As used herein, the term "alkoxy" or "alkoxyl" refers to alkyl groups attached to an oxygen atom by a single bond. The other bond of the oxygen atom is connected to a carbon atom. Examples include, without limitation, methoxy, ethoxy, propoxy, isopropoxy, cyclopropyloxy, and cyclohexyloxy groups.

As used herein, the term "compound" refers to a curable composition, such as, for example, a mixture of chemical entities that comprises at least a fluoroelastomer and a curing agent. The mixture of chemical entities has not been cured nor has undergone processing conditions that would cause the curing of the mixture of chemical entities to undergo curing.

As used herein, the term "fluoro-", when placed as a prefix before a chemical entity name, refers to a chemical entity that has at least one fluorine atom, including without limitation: fluoroelastomers, perfluoroelastomers, fluorovinyl, and perfluorovinyl ethers. The prefix "perfluoro-", as used herein, refers to fully fluorinated molecules or moieties in which every position that could be occupied by a hydrogen atom is occupied by a fluorine atom. The prefix "fluoro-", when placed before a chemical entity name, expressly includes perfluorinated chemical entities. Thus, the prefix "fluoro-" refers to fluorinated molecules or groups, to fully fluorinated molecules or groups, or to a combination of fluorinated molecules or groups and fully fluorinated molecules or groups.

As used herein, the term "aromatic" refers to a chemical entity comprising at least one unsaturated ring of atoms that is stabilized by an interaction of the bonds forming the ring. Such chemical entities are typified by benzene and naphthalene.

As used herein, the term "phenyl" refers to a chemical entity having the formula $—C_6H_5$ derived from benzene by removal of one hydrogen atom. The carbon atom lacking the hydrogen atom is used to form a bond to another chemical entity.

As used herein, the term "cured" and associated terms derived from the verb "to cure" refer to covalent crosslinking. For example, a fluoroelastomer compound is cured when it has been exposed to those conditions that cause the fluoroelastomer molecules and the curing agent, if any, to form sufficient crosslinks (that is, curing conditions) such that the resultant entity has taken on a form or shape or configuration or structure that cannot be reprocessed, molded, or extruded into a different one. Once a resultant entity that comprised a fluoroelastomer compound has been cured by exposure to curing conditions, the covalent crosslinking cannot be reversed, nor can the entity be re-cured to assume a substantially different form or structure. The resultant entity may be an article, as defined above.

The term "cured" and associated terms derived from the verb "to cure" also include differing degrees of processing of a compound such that the resultant entity may exhibit a range of physical properties as a result of the different extent of curing. For example, a compound may be initially cured to achieve a non-reprocessable form, shape, etc., within the meaning of the term "cured" as set forth herein. The cured compound may subsequently be subjected to additional curing conditions, which provide further curing. Such additional curing conditions may be referred to herein as "curing" or as "post-curing". Stated alternatively, the term "cured" and associated terms derived from the verb "to cure" refer to an initial curing process that results in a first cured, resultant entity and also refer to any subsequent curing process that results in a subsequently cured, resultant entity that may possess different material or physical properties than those of the first cured, resultant entity.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc., whether identified as preferred or not, of the processes, compounds and articles described herein specifically intends to include any possible combination of materials, methods, steps, values, ranges, etc. Any combination described herein is a preferred variant of the processes, compounds, and articles described herein.

Compounds

Provided herein are compounds that comprise certain curing agents. More specifically, the compounds comprise:

A. a fluoroelastomer comprising copolymerized units of:
   (1) one or more fluorinated olefins;
   (2) one or more olefin co-monomers different from (1) selected from the group consisting of fluorovinyl ethers, hydrocarbon olefins, and mixtures of these; and
   (3) one or more cure site monomers selected from the group consisting of nitrile-containing fluorinated olefins and nitrile-containing fluorinated vinyl ethers; and B. a curing agent that comprises amidocarboxylic acid and a molecule that comprises an amidine moiety, or the amidocarboxylic acid salt of a molecule that comprises an amidine moiety.

A) Fluoroelastomers

Fluoroelastomers A suitable for use in the compounds described herein may be fluorinated or perfluorinated and comprise at least the following three copolymerized monomer units: A(1) one or more fluorinated olefins; A(2) one or more olefin co-monomers that are different from fluorinated olefin A(1) and that are selected from the group consisting of fluoroalkylvinyl ethers, fluoroalkoxy vinyl ethers, hydrocarbon olefins, and mixtures of two or more of these; and A(3) one or more cure site monomers selected from the group consisting of nitrile-containing fluorinated olefins and nitrile-containing fluorinated vinyl ethers.

Preferred fluoroelastomers A comprise at least the following three copolymerized monomer units: A(1) about 25 to 74.9 mole percent of one or more fluorinated olefins; A(2) about 25 to 74.9 mole percent of one or more olefin co-monomers that are different from fluorinated olefin A(1) and are selected from the group consisting of fluorovinyl ethers, hydrocarbon olefins, and mixtures of two or more of these; and A(3) about 0.1 to 10 mole percent of one or more cure site monomers selected from the group consisting of nitrile-containing fluorinated olefins and nitrile-containing fluorinated vinyl ethers. The mole percentage of the copolymerized repeat units of each of A(1), (2), and (3) is based on the total number of moles of copolymerized repeat units in fluoroelastomer A, and the sum of the mole percentages of copolymerized repeat units of comonomers A(1), (2), and (3), and copolymerized repeat units of any other comonomer(s) that may be present in fluoroelastomer A is 100 mol %.

Fluoroelastomers A suitable for use in the compounds described herein may contain a variety of end groups as a result of the use of varying initiators or chain transfer agents during polymerization. Non-limiting examples of suitable end groups include sulfonate, sulfonic acid, carboxylate, carboxylic acid, carboxamide, difluoromethyl groups, trifluorovinyl groups, and perfluorinated alkyl groups. Also suitable are fluoroelastomers A having two different end groups. Carboxylic acids are preferred end groups.

The compounds may comprise two or more fluoroelastomers A that differ from each other in any respect, including, but not limited to, different comonomer(s) (1), (2), or (3); one or more additional comonomers; the same comonomers (1), (2), and (3) and the same additional comonomer(s), if present, with different composition range(s); different end group(s); different synthesis methods; or different molecular weights.

A)(1) Fluorinated Olefins

Suitable fluorinated olefins A(1) include, without limitation, monomers comprising at least one ethylenically unsaturated carbon-carbon bond and at least one fluorine atom, preferably at least two fluorine atoms. More preferably, the fluorinated olefins A(1) are perfluorinated monomers. Examples of suitable fluorinated olefins include, for example, tetrafluoroethylene; 1,1-difluoroethylene; 1,1,2-trifluoroethylene; 1-fluoroethylene; chlorotrifluoroethylene; 1-fluoropropylene; 1,1-difluoropropylene; 1,1,3-trifluoropropylene; 1,2,3,3,3-pentafluoropropene; 1,1,3,3,3-pentafluoropropene; hexafluoropropylene; and combinations of two or more of these. Still more preferred fluorinated olefins include, tetrafluoroethylene, 1,1-difluoroethylene and hexafluoropropylene. The concentration of fluorinated olefin A(1) may range from about 25.0 to about 74.9 mole percent of the total moles of monomer units in fluoroelastomer A. Preferred and more preferred ranges of fluorinated olefin A(1) are derived by difference, based on the preferred ranges of other comonomers of fluoroelastomer A set forth below and on the principle that the total number of mole percentages of the comonomers of fluoroelastomer A is 100 mol %.

A)(2) Olefin Co-Monomers

Suitable olefin co-monomer A(2), which is different from fluorinated olefin A(1), is selected from the group consisting of fluorovinyl ethers, hydrocarbon olefins, and combinations of two or more of these.

Examples of suitable fluorovinyl ethers include, for example, perfluoro(alkyl vinyl) ethers, perfluoro(alkoxy vinyl) ethers, fluoro(alkyl vinyl) ethers, fluoro(alkoxy vinyl) ethers, and combinations of two or more of these. Suitable fluorovinyl ether monomers include, for example, those shown in formulas (I) to (V):

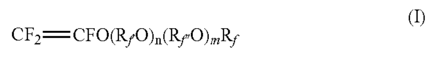

$$CF_2{=}CFO(R_{f'}O)_n(R_{f''}O)_mR_f \quad (I)$$

where $R_f$ is a linear or branched perfluoroalkyl group of 1 to 6 carbon atoms, $R_{f'}$ and $R_{f''}$ are different linear or branched perfluoroalkylene groups of 2 to 6 carbon atoms, and m and n are independently selected integers such that 0≤m≤10 and 0≤n≤10.

Additional examples of suitable fluorovinyl ether monomers include compositions of formula (II):

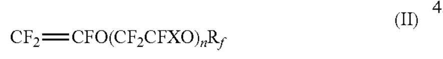

$$CF_2{=}CFO(CF_2CFXO)_nR_f \quad (II)$$

where X is F or $CF_3$, n is an integer equal to 0, 1, 2, 3, 4, or 5, and $R_f$ is a linear or branched perfluoroalkyl group of 1 to 6 carbon atoms. Preferably, n is equal to 0 or 1 and $R_f$ contains 1 to 3 carbon atoms. Examples of such fluorovinyl ether monomers include perfluoro(methyl vinyl) ether and perfluoro(propyl vinyl) ether.

Other fluorovinyl ether monomers suitable for the preparation of fluoroelastomer (A) include compounds of formulas (III), (IV), and (V):

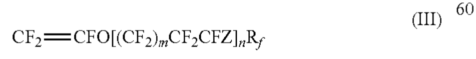

$$CF_2{=}CFO[(CF_2)_mCF_2CFZ]_nR_f \quad (III)$$

where $R_f$ is a linear or branched perfluoroalkyl group having 1 to 6 carbon atoms, m is an integer equal to 0 or 1; n is an integer equal to 0, 1, 2, 3, 4, or 5; and Z is F or $CF_3$;

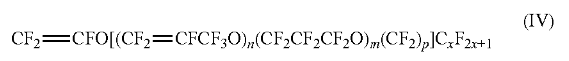

$$CF_2{=}CFO[(CF_2{=}CFCF_3O)_n(CF_2CF_2CF_2O)_m(CF_2)_p]C_xF_{2x+1} \quad (IV)$$

where m and n are independently selected integers such that 0≤m≤10 and 0≤n≤10; p is an integer equal to 0, 1, 2, or 3; and x is an integer equal to 0, 1, 2, 3, 4, or 5. Specific embodiments of this class include compounds where n=0 or n=1; independently, m=0 or m=1; and x=1.

Still other suitable fluorovinyl ether monomers include those of the following formula:

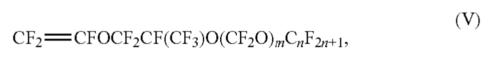

$$CF_2{=}CFOCF_2CF(CF_3)O(CF_2O)_mC_nF_{2n+1}, \quad (V)$$

where n is an integer equal to 0, 1, 2, 3, 4, or 5; m is an integer equal to 0, 1, 2, or 3; and where, preferably, n=1.

Examples of preferred fluorovinyl ether monomers include perfluoro methyl vinyl ether, perfluoropropyl vinyl ether, and perfluoroethyl vinyl ether, and combinations of two or more of these. Examples of preferred perfluoro (alkoxy vinyl) ethers include perfluoromethoxy vinyl ether, perfluoropropoxy vinyl ether, and perfluoroethoxy vinyl ether, and combinations of two or more of these. Examples of preferred hydrocarbon olefins include ethylene, propylene, 1-butene, 2-butene, and combinations of two or more of these.

Suitable fluoroelastomers A may include copolymerized residues of at least one fluorovinyl ether, at least one fluorinated olefin, and at least one hydrocarbon olefin.

The concentration of the olefin co-monomer A(2) in fluoroelastomer A ranges from 25 to 74.9 mole percent, preferably from 30 to 65 mole percent, more preferably from 45 to 55 mole percent, based on the total number of moles of copolymerized monomer units in fluoroelastomer A.

A) (3) Cure Site Monomers

Fluoroelastomer A further comprises copolymerized units of one or more cure site monomers (3), generally in amounts of from 0.1 to 10 mole percent, preferably between 0.3 and 1.5 mole percent, based on the total number of moles of copolymerized monomer units in fluoroelastomer A. Although more than one type of cure site monomer may be present, cure site monomers comprising at least one nitrile substituent group are preferred. Preferred cure site monomers include, but are not limited to, nitrile-containing fluorinated olefins and nitrile-containing fluorinated vinyl ethers. Useful nitrile-containing cure site monomers include those of formulae (VI) to (X):

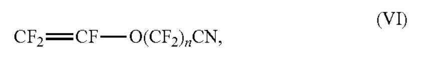

$$CF_2{=}CF{-}O(CF_2)_nCN, \quad (VI)$$

where n is an integer such that 2≤n≤12, and preferably 2≤n≤6;

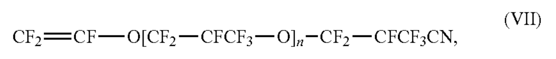

$$CF_2{=}CF{-}O[CF_2{-}CFCF_3{-}O]_n{-}CF_2{-}CFCF_3CN, \quad (VII)$$

where n is an integer equal to 0, 1, 2, 3, or 4; and preferably n equals 0, 1, or 2;

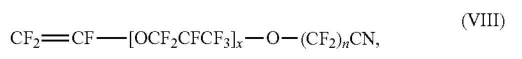

$$CF_2{=}CF{-}[OCF_2CFCF_3]_x{-}O{-}(CF_2)_nCN, \quad (VIII)$$

where x equals 1 or 2, and n is an integer equal to 0, 1, 2, 3, or 4; and

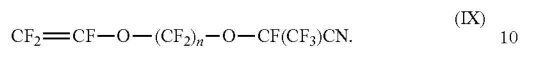

$$CF_2{=}CF{-}O{-}(CF_2)_n{-}O{-}CF(CF_3)CN. \quad (IX)$$

where n is an integer equal to 2, 3, or 4.

Preferably, monomers of formula (VII) are used as cure site monomers. More preferred cure site monomers include perfluorinated polyethers having a nitrile group and a trifluorovinyl ether group. A particularly preferred cure site monomer is perfluoro(8-cyano-5-methyl-3,6-dioxa-1-octene) (8-CNVE), represented by formula (X):

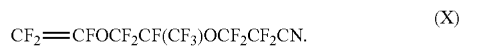

$$CF_2{=}CFOCF_2CF(CF_3)OCF_2CF_2CN. \quad (X)$$

B) Curing Agents

The compounds described herein further comprise a curing agent that comprises an amidocarboxylic acid and a molecule that comprises an amidine moiety. Alternatively, the curing agent comprises the amidocarboxylic acid salt of a molecule that comprises an amidine moiety. Any amidine-containing molecule and any combination of two or more amidine-containing molecules are suitable for use in the curing agent described herein. Some suitable amidine-containing molecules are described in U.S. Pat. No. 9,908,992, issued to Fox et al., and in U.S. Pat. No. 7,521,510, issued to Aufdermarsh et al. Preferred amidine-containing molecules are selected from the group consisting of molecules having the formulas (XI), (XII) and (XIII):

(XI)

(XII)

(XIII)

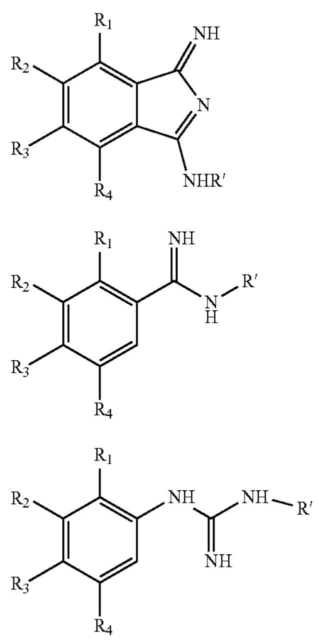

wherein each of $R_1$, $R_2$, $R_3$, and $R_4$ is selected from the group consisting of H, halogen atom, $C_1$ to $C_4$ alkyl groups in which the alkyl group is linear, branched, or cyclic; at least two of $R_1$, $R_2$, $R_3$, and $R_4$ can form a ring with a saturated or unsaturated hydrocarbon entity such that the phenyl group becomes an optionally substituted bicyclo or tricyclo group, such as a naphthyl or phenanthryl, anthracenyl, perhydronaphthyl, 1,2,3,4-tetrahydronaphthyl ("tetralinyl"), perhydrophenanthryl or perhydroanthracenyl group; OR'; and aromatic groups;

R' is selected from the group consisting of H; $C_1$ to $C_4$ alkyl groups in which the alkyl group is linear, branched, or cyclic; and phenyl or substituted phenyl. When R' is a substituted phenyl group, it may be substituted with one or more of $R_1$, $R_2$, $R_3$, and $R_4$, as defined above, except that $R_1$, $R_2$, $R_3$, and $R_4$ will form no further rings when present as substituents of the substituted phenyl groups.

Non-limiting examples of curing agents of formulas (XI) include isoindolines, substituted isoindolines, isoindoline derivatives, and combinations of two or more of these. Suitable isoindolines are described in detail in U.S. Pat. No. 5,691,272, issued to Matsumoto et al. Preferred isoindolines include, without limitation, 1,3-diiminoisoindoline, 5,6-dichloro-1,3-diiminoisoindoline, 4,5,6,7-tetrachloro-1,3-diiminoisoindoline, 5,6-difluoro-1,3-diiminoisoindoline, 4,5,6,7-tetrafluororo-1,3-diiminoisoindoline, 4,7-dihydroxy-1,3-diiminoisoindoline, 5,6-dimethyl-1,3-diiminoisoindoline, 5,6-dicyano-1,3-diiminoisoindoline, 5,6-bis-phenyloxy-1,3-diiminoisoindoline, and 5,6-bis-o-toluyloxy-1,3-diiminoisoindoline. More preferred are 1,3-diiminoisoindoline and combinations of two or more curing agents comprising 1,3-diiminoisoindoline.

Non-limiting examples of curing agents of formulas (XII) include benzamidine, a substituted benzamidine, a benzamidine derivative, or a combination of two or more of these. Suitable amidines are described in U.S. Pat. No. 7,514,506, issued to Mansfield et al. Preferred benzamidines include, but are not limited to, benzamidine, 2-methyl benzamidine, 3-methylbenzamidine, 4-methylbenzamidine, 2-phenylbenzamidine, 3-phenylbenzamidine, 4-phenylbenzamidine, 2-3-methoxybenzamidine, 4-methoxybenzamidine, 2-chlorobenzamidine, 3-chlorobenzamidine, 4-chlorobenzamidine, 2-fluorobenzamidine, 3-fluorobenzamidine, 4-fluorobenzamidine, 2-trifluoromethylbenzamidine, 3-trifluoromethylbenzamidine, 4-trifluoromethylbenzamidine, 2-cyanobenzamidine, 4-cyanobenzamidine, 2-hydroxybenzamidine, 4-hydroxybenzamidine, 4-hydroxybenzamidine α-papthamidine, β-naphthamidine, N-methylbenzamidine, N-phenylbenzamidine, N-toluylbenzamidine. More preferred are benzamidine, N-phenylbenzamidine, and combinations of two or more curing agents comprising benzamidine or N-phenylbenzamidine.

Non-limiting examples of curing agents of formulas (XIII) include guanidine, a substituted guanidine, a guanidine derivative, or a combination of two or more of these. Suitable guanidines are described in U.S. Pat. No. 6,638, 999, issued to Bish et al. Examples of preferred guanidines and guanidine derivatives include, but are not limited to, N,N'-diphenylguanidine; N-phenyl-N'-methylguanidine; Methylphenyl))-N'-phenyl guanidine; N-(3-methylphenyl)-N"-phenyl guanidine; N-(4 methylphenyl)-N"-phenyl guanidine; N-(2-chlorophenyl)-N"-phenyl guanidine; N-(3-chlorophenyl)-N"-phenyl guanidine; N-(4-chlorophenyl)-N"-phenyl guanidine; N-(2-fluorohenyl)-N"-phenyl guanidine; N-(3-fluorophenyl)-N"-phenyl guanidine; N-(4- fluorophenyl)-N'-phenyl guanidine; N-(4-trifluoromethylphenyl)-N'-phenyl guanidine; N-(2-trifluoromethylphenyl)-N"-phenyl guanidine; N,N'-(di-2-Methylphenyl) guanidine; N-2-Naphthalenyl-N'-phenylguanidine; and N-(4-methylphenyl)-N"-phenyl guanidine. More preferred are N,N"-diphenylguanidine and combinations of two or more curing agents comprising N,N"-diphenylguanidine.

The curing agent B further includes an amidocarboxylic acid. Any amidocarboxylic acid and any combination of two or more amidocarboxylic acids are suitable for use in the curing agent B. Suitable amidocarboxylic acids have the following formula (XIV):

(XIV)

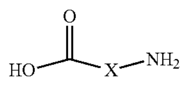

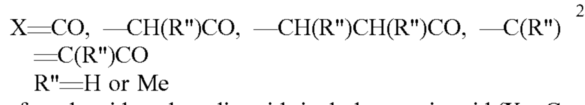

X═CO, —CH(R")CO, —CH(R")CH(R")CO, —C(R")═C(R")CO

R"═H or Me

Preferred amidocarboxylic acids include oxamic acid (X═C(O)), malanomic acid (X═$CH_2$C(O)), 3-methyl malanomic acid (X═CH($CH_3$)C(O), R and S isomers), and combinations of two or more of these acids or their amidine salts. Alternatively, the curing agent includes one or more salts of the amidocarboxylic acid with an amidine of structure (XI, XII, or XIII).

Without wishing to be held to theory, it is believed that the amidocarboxylic acid forms a complex with the amidine and retards cure chemistry at the processing temperature. It is further hypothesized that the amidocarboxylic acid participates in the curing process at higher temperature as a secondary curing agent, generating a more stable cross-linked network. This dual system aids processability, reduces scorch by increasing processing times, and enhances performance of the cured compounds and articles.

The curing agents can be synthesized by combining the amidocarboxylic acid with the one or more amidine-containing molecules. The resulting acid-base reaction is instantaneous upon contact between the amidocarboxylic acid and the amidine moiety or moieties.

In practice, each of the amidocarboxylic acid and the amidine-containing molecule(s) may be added neat to fluoroelastomer A in the blending process that produces the compound. Alternatively, the salt may be pre-formed, for example by reacting amidocarboxylic acid with amidine-containing molecule(s) in solution to form the amidocarboxylic acid salt(s), and then adding the salt to fluoroelastomer A in the blending process that produces the compound. Suitable solvents include common organic solvents, preferably acetone. The salt is isolated as a solid, substantially free of solvent, before addition to the blend from which the compound is produced.

The amidine-containing molecule(s) and the amidocarboxylic acid(s) may be combined in a molar ratio of from 2 moles of amidine-containing molecule(s) to 1 mole amidocarboxylic acid(s) (2:1) to 1:2 or from 2:1 to 1:3 to form the curing agent B. Preferably, the amidocarboxylic acid(s) and the amidine-containing molecule(s) are combined in equal molar amounts, i.e., 1:1 is the molar ratio.

The concentration of curing agent B in the fluoroelastomer compounds ranges from about 0.1 to about 10 phr, preferably from 0.1 to 5 phr, more preferably about 0.3 to about 2 phr, based on the total amount of fluoroelastomer A. An excess of curing agent B relative to the amount required to react with all the cure sites present in fluoroelastomer A may be used.

Additives

The compounds described herein may include one or more additives. Suitable additives and amounts are described in detail in U.S. Pat. No. 9,908,992, cited above. Preferred additives including, without limitation, fillers, stabilizers, plasticizers, lubricants, and processing aids typically utilized in compounding can be incorporated into the compounds described herein, provided they have adequate stability for the intended service conditions. In particular, low temperature performance can be enhanced by incorporation of perfluoropolyethers.

Briefly, however, fillers may be used in elastomers as a means to balance modulus, tensile strength, elongation, hardness, abrasion resistance, conductivity, and processability of these compounds. Carbon black is most commonly used. The compounds described herein may include one or more grades of carbon black.

Examples of suitable carbon blacks include MT blacks (medium thermal black) designated N-991, N-990, N-908, and N-907, and large particle size furnace blacks. MT blacks are preferred.

One or more non-carbon black fillers may be present in the compounds described herein. An example of a suitable non-carbon black filler is silica, such as anhydrous silica, acidic silica, fumed silica, or precipitated silica. Surface-treated silicas are also suitable. Such silicas are available from Degussa Aktiengesellschaft (Frankfurt, Germany) under the Aerosil™ trademark. A particularly useful type is Aerosil™ 200 silica and Aerosil™ 972 silica. Other suitable silicas include Reolosil™ silicas, available from Tokuyama KK (Tokyo, Japan), for example Reolosil™ QS13, Reolosil™ QS102, and Reolosil™ QS30.

Additional suitable types of non-carbon black fillers include mineral fillers, such as $BaSO_4$, $Al_2O_3$, and $TiO_2$, polymeric micropowders, and fluoroadditives, for example. Polymeric micropowders are ordinarily partially crystalline polymers. Micropowders include finely divided, easily dispersed plastic fluoropolymers that are solid at the highest temperature utilized in fabrication and curing of the compounds described herein. By solid, it is meant that the plastic fluoropolymer has a crystalline melting temperature above the processing temperature(s) of the compounds described herein.

Polymeric micropowders that can be used in these compounds include, but are not limited to, polymeric micropowders based on the group of polymers known as tetrafluoroethylene (TFE) polymers. This group includes polytetrafluoroethylene (PTFE) and copolymers of TFE with small concentrations of about 1 mole percent or less of at least one copolymerizable modifying monomer such that the polymeric micropowders do not melt or soften during processing of fluoroelastomer (A), which comprises the polymeric micropowders. The modifying monomer may be, for example, hexafluoropropylene (HFP), perfluoro(propyl vinyl) ether (PPVE), perfluorobutyl ethylene, chlorotrifluoroethylene, or another monomer that introduces side groups into the polymer molecule.

Tetrafluoroethylene polymers used as additives for fluoroelastomer compounds include copolymers of TFE having sufficient concentrations of copolymerized units of one or more monomers to reduce the melting point below that of PTFE. Such copolymers generally have melt viscosity in the range of 0.5-60×103 Pas, but viscosities outside this range are also known. Perfluoroolefins and perfluoro(alkyl vinyl)

ethers are preferred comonomers. Hexafluoropropylene and perfluoro(propyl vinyl) ether are most preferred. Examples of TFE copolymers include TFE/hexafluoropropylene copolymer and TFE/perfluoro(propyl vinyl)ether copolymers, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The compounds described herein may additionally comprise polymeric reinforcing filler. The polymeric reinforcing filler includes thermoplastic and thermosetting polymers. The polymeric reinforcing filler may or may not be capable of crosslinking with any fluoroelastomer A cure site. Non-limiting examples of polymeric reinforcing fillers are those having, at least at either its main chain or an end of its side chain, at least one kind of crosslinkable group selected from the group consisting of: cyano (—CN), carboxyl (—COOH), alkoxycarbonyl (—$COOR_9$, where $R_9$ is a monovalent organic group), and an acid halide group (—COX1, where $X_1$ is a halogen atom) capable of a crosslinking reaction with fluoroelastomer A.

The fluorine-containing polymer may contain a monomer unit independently selected from the group consisting of vinylidene fluoride (VDF), tetrafluoroethylene, and hexafluoropropylene, and at least one additional monomer such as tetrafluoroethylene, hexafluoropropylene, perfluoro (alkyl vinyl ether), chlorotrifluoroethylene, trifluoroethylene, trifluoropropylene, pentafluoropropylene, trifluorobutene, tetrafluoroisobutene, vinyl fluoride, and iodine-containing fluorinated vinyl ethers, ethylene, propylene, alkyl vinyl ether, and combinations of these.

Examples of suitable polymeric reinforcing fillers include, but are not limited to, thermoplastic fluorine-containing polymers.

In general, the amount of each individual filler may range from 0.01 phr, preferably 1 phr, to 200 phr, based on the amount of fluoroelastomer in the compound. Also generally, when the compound comprises more than one filler, the total amount of all fillers is less than or equal to 200 phr. More particularly, when the compound comprises one or more polymeric fillers, the amount of the filler(s) ranges from about 0.01 to about 200 parts and preferably at least about 1 to about 50 parts, based on the total parts of fluoroelastomer A. When the compound comprises one or more carbon black fillers, the amount ranges from about 0.01 to about 70 phr of carbon black(s), preferably from about 0.01 to about 50 phr, more preferably from about 1 to about 50 phr, and still more preferably from about 10 to about 50 phr, or from about 20 to about 40 phr, or from about 25 to about 35 phr, based on 100 parts of fluoroelastomer A. The amount of non-carbon black filler(s) in the compound preferably ranges from about 1 to about 100 phr, preferably from about 1 to about phr, based on 100 parts of fluoroelastomer A.

Process for Producing Compounds

The fluoroelastomer compounds described herein may be prepared by mixing until homogeneous fluoroelastomer A, curing agent(s) B, and optional components such as filler(s) and other additive(s) using conventional rubber compounding procedures such as a two roll rubber mill, an internal mixer, for example, a Banbury internal mixer, or in an extruder. During these compounding processes, care is taken to maintain the temperature of the compound at or below its curing temperature.

Articles

Further provided are uncured articles comprising one or more of the compounds described herein and cured articles resulting from curing these uncured articles. The cured articles comprise a product or products of curing one or more of the compounds described herein. Suitable and preferred compounds for use in the cured and uncured articles are as described above with respect to the compounds themselves.

The uncured articles are produced from the compounds by conventional forming methods such as extrusion, calendering, and molding. During these formation processes, care is taken to maintain the temperature of the compound at or below its curing temperature.

Curing the Compounds and Articles

The compounds and uncured articles described herein may be cured by the application of heat or pressure sufficient to cause curing agent B to form crosslinks with cure site monomer(s). When compression molding is used as the curing process, a press cure cycle is preferably followed by a post cure cycle during which the press cured compound is heated at elevated temperatures normally above molding temperature for several hours.

Some preferred processes for curing the compounds and articles described herein comprise curing compounds that comprise fluoroelastomer A with at least one curing agent. The preferred compositions of the compounds and uncured articles for use in this process are as described above.

The vulcanization reaction (curing) of the compound normally takes place under heat. The speed of the vulcanization reaction increases with increasing temperature. For an ideal curing agent, the vulcanization is fast at the high curing temperature and slow in the low-temperature pre-vulcanization processes such as mixing and extrusion.

Scorch in rubber technology refers to premature vulcanization of the compound before the final curing or crosslinking can be accomplished. The concern with faster-curing compounds is the low scorch time or "scorch safety." Scorch time is usually reported as the time at which a compound achieves a given viscosity increment at typical mixing and extrusion temperatures, normally at or below 121° C. T3, T10, and T18 are the time in minutes for the compound viscosity increase by 3, 10, and 18 units, respectively, in Mooney viscosity at testing temperature, typically at 121° C. The longer the time before the viscosity reaches the predetermined increment, the better the scorch safety of the compound. The viscosity component of the scorch time determination is typically measured by a viscometer, such as a Mooney Viscometer, and reported in Mooney units. In general, for a compound to be considered scorch-safe, the time for the compound's viscosity to increase by 10 Mooney units, T10, is more than 10 minutes, preferably more than 20 min, or more preferably greater than 30 min when tested at 121° C.

Typically, curing behavior is measured by rheometer, such as a Moving Die Rheometer (MDR), at a fixed interval or intervals. The curing behavior of a rubber compound is normally measured at the temperature of vulcanization, curing or crosslinking. Typically, this temperature ranges from 150° C. to 210° C. It is characterized by the viscosity increase at that temperature. The larger increase of viscosity indicates a better vulcanization. The time before the large increase of viscosity needs to be sufficient to allow a mold to be loaded, which is another measure for better processability or scorch safety. Ts2 is the time of viscosity to increase by 2 units of torque, measured in dN·m. The longer the time, the better scorch safety of the compound. Ts2 is preferably more than 30 seconds, more preferably greater than 1 minute.

When cured and optionally post-cured, the articles described herein exhibit suitable thermal stability and chemical resistance for applications that require exposure to harsh conditions, such as those used in semiconductor wafer processing.

Favorable properties of cured articles include suitable ranges of hardness, tensile strength, and compression set.

The chemical structure of the elastomers provides them with an inherent hardness which can be measured in terms of durometer on a Shore scale. Harder rubber usually has a higher tensile modulus (see below), making it more resilient. It is also more resistant to extrusion, which is a process for manufacturing stock materials used in custom fabrication.

The compression set of a material is the permanent deformation remaining after removal of a force that was applied to it. A lower value of compression set, i.e., less deformation, is favorable in sealing applications.

Tensile strength is the amount of force needed to tear apart a rubber specimen until it breaks. It is also known as ultimate tensile strength and is reported in units of megapascals or pounds per square inch (psi) according to ASTM D412. The tensile strength is a key factor for designers and buyers as it signifies the point of failure resulting from the stretching of rubber. A higher tensile strength is favorable in sealing applications.

Tensile modulus is the stress or force required for producing a strain or an elongation percentage in a rubber sample. Tensile modulus and tensile strength are two different properties. A moderate tensile modulus is favorable in sealing applications. The sealing material must deform sufficiently to conform to the equipment that is to be sealed.

The cured articles described herein are useful as O-rings, seals and gaskets for high temperature contexts, in a wide range of chemical environments, for example in high temperature automotive uses, and in semiconductor fabrication equipment.

Some notable embodiments of the cured and uncured compounds, articles, and processes described herein include one or more of the following features:

- the fluorinated olefin A(1) is selected from the group consisting of tetrafluoroethylene; hexafluoropropylene; 1,1-difluoroethylene; 1,1,2-trifluoroethylene; 1-fluoroethylene; and combinations of two or more of these;
- the fluorinated olefin co-monomer A(2) is selected from the group consisting of perfluoro(methyl vinyl) ether, perfluoro(propyl vinyl) ether, and combinations thereof;
- the curing agent B is an amidocarboxylic acid salt of an amidine-containing molecule;
- the curing agent B is selected from an oxamic acid salt of 1,3-diiminoisoindoline or of 5,6-dichloro-1,3-diiminoisoindoline, diphenyl guanidine, or benzamidine;
- the compound comprises at least one filler; and
- the at least one filler is selected from the group consisting of polymeric reinforcing fillers, polymeric micropowders, mineral micropowders, carbon black, stabilizers, plasticizers, lubricants, processing aids, and combinations of two or more of these.

The following examples are provided to describe the invention in further detail. These examples, which set forth a preferred mode presently contemplated for carrying out the invention, are intended to illustrate and not to limit the invention.

EXAMPLES

Examples of the invention are identified by "E" in the tables below, and comparative examples are identified by "C".

Preparation of Curing Agents

1,3-diiminoisoindolinium Oxamate (B1)

A 100 mL 2-neck round bottom flask under nitrogen atmosphere was charged with 1,3-diiminoisoindoline (6.0 g, 41.33 mmol) and acetone (50 mL). The mixture was stirred for 15 minutes at room temperature and oxamic acid (3.68 g, 41.33 mmol) was slowly added in small portions with vigorous stirring maintaining temperature around 25° C. The mixture was stirred at room temperature (RT) for 12 h. The thick slurry formed was filtered and washed with acetone (2×3 mL). The filtered solid was then dried under vacuum at 70° C. to obtain 1,3-diiminoisoindolinium oxamate (9.4 g, 40.10 mmol) as an off-white solid.

1,3-diiminoisoindolinium Acetate (B2)

Following the procedure described above for the synthesis of 1,3-diiminoisoindolinium oxamate, stirring a mixture of 1,3-diiminoisoindoline (6.0 g, 41.33 mmol) and acetic acid (2.48 g, 41.33 mmol) in acetone, followed by filtration and drying obtained 1,3-diiminoisoindolinium acetate (8.33 g, 39.8 mmol) as an off-white solid.

1,3-diiminoisoindolinium Oxalate (B3)

Following the procedure described above for the synthesis of 1,3-diiminoisoindolinium oxamate, stirring a mixture of 1,3-diiminoisoindoline (6.0 g, 41.33 mmol) and oxalic acid (1.87 mmol, 2.06 mmol) in acetone, followed by filtration and drying obtained 1,3-diiminoisoindolinium oxalate (7.60 g) as an off-white solid.

Diphenylgaunidinium Oxamate (B4)

Following the procedure described above for the synthesis of 1,3-diiminoisoindolinium oxamate, stirring a mixture of diphenyl guanidine (4.97 g, 28.4 mmol) and oxamic acid (3.68 g, 28.4 mmol) in acetone, followed by filtration and drying obtained diphenylguanidinium oxamate (8.36 g, 27.8 mmol) as a white solid.

Benzamidinium Oxamate (B5)

Following the procedure described above for the synthesis of 1,3-diiminoisoindolinium oxamate, stirring a mixture of benzamidine (4.96 g, 41.33 mmol) and oxamic acid (3.68 g, 41.33 mmol) in acetone, followed by filtration and drying obtained benzamidinium oxamate (8.33 g, 39.8 mmol) as a white solid.

Materials

Perfluoroelastomer having the formula TFE/PMVE/cyano cure site monomer as described in U.S. Pat. No. 6,638,999, issued to C. Bish et al., or U.S. Pat. No. 9,908,992, issued to P. Fox et al.

1,3-diimino isoindoline: available from MilliporeSigma of St. Louis, MO, previously known as Sigma-Aldrich Oxamic acid: available from MilliporeSigma MT Carbon black or N-990 (CB): available from Cancarb Limited of Medicine Hat, Alberta, Canada Test Methods Compound scorch or Pre-Vulcanization Characteristics Characterized by viscosity increase using Mooney viscometer (Alpha Technology Mooney mv2000) based on ASTM D1646 (2019). Mooney Scorch is run by Small Rotor at 121 C for 30 mins.

| | |
|---|---|
| Initial Peak after Preheat [MU] | Initial viscosity |
| Min Mooney = ML [MU] | Minimum viscosity |
| T3 [min] | Time for viscosity increase 3 units |
| T5 [min] | Time for viscosity increase 5 units |
| T10 [min] | Time for viscosity increase 10 units |
| T18 [min] | Time for viscosity increase 18 units |
| T35 [min] | Time for viscosity increase 35 units |
| Final Viscosity [MU] | Final viscosity |

Cure characteristics were measured using a Monsanto Moving Die Rheometer (MDR 2000) instrument under the following conditions: ASTM D5289 (2019).

Temperature: various listed in the table.

Moving die frequency: 1.66 Hz

Oscillation amplitude: 0.5

Duration of test: 20 minutes

The following cure parameters were recorded:

$M_H$: maximum torque level, in units of dN·m $M_L$: minimum torque level, in units of dN·m $t_s2$: minutes to 2 units rise above $M_L$ $t_c90$: minutes to 90% of maximum torque Test specimens were prepared from elastomer compounded with appropriate additives, as described in the formulations listed in the Examples below.

Compounding was carried out on a rubber mill. The milled composition was formed into a sheet and a sample was extruded through a die to form a disk-shaped test specimen for Mooney and MDR measurements.

O-rings were made by punching pre-forms from a sheet. The pre-forms were molded and post-cured.

Tensile Properties

Unless otherwise noted, stress/strain properties were measured on K214 o-rings. Physical property measurements were obtained according to methods described in ASTM D412 (2016) & D1414 (2015). The following parameters were recorded:

$M_{100}$, modulus at 100% elongation in units of MPa $T_B$, tensile strength at break in units of MPa.

$E_B$, elongation at break in units of %

Compression set of O-ring samples was determined in accordance with ASTM D395B (2019) and D1414.

Table 1 shows formulations for Examples and Comparative examples.

TABLE 1

| | E1 | E2 | E3 | E4 | E5 | C1 | C2 | C3 | C4 | C5 | C6 |
|---|---|---|---|---|---|---|---|---|---|---|---|
| A1 | 100 | 100 | 100 | 100 | 100 | 100 | 100 | 100 | 100 | 100 | 100 |
| B1 1,3-diiminoisoindolinium oxamate | | | 0.67 | | | | | | | | |
| B2 1,3-diiminoisoindolinium acetate | | | | | | | | 0.59 | | | |
| B3 1,3-diiminoisoindolinium oxalate | | | | | | | | | 0.68 | | |
| 1,3-diiminoisoindoline | 0.42 | 0.42 | | | | 0.42 | | | | | |
| Oxamic acid | 0.3 | 0.23 | | | | | 0.3 | | | | |
| B4 diphenylguanidinium oxamate | | | | 0.92 | | | | | | | |
| B5 Benzamidinium oxamate | | | | | 0.64 | | | | | | |
| Diphenylguanidine | | | | | | | | | | 0.65 | |
| Benzamidine | | | | | | | | | | | 0.37 |
| CB | 30 | 30 | 30 | — | — | 30 | 30 | 30 | 30 | | |

Table 2 describes the results Mooney Scorch, MDR, tensile and compression set data of various formulation.

TABLE 2

| | E1 | E2 | E3 | E4 | E5 | C1 | C2 | C3 | C4 | C5 | C6 |
|---|---|---|---|---|---|---|---|---|---|---|---|
| Mooney Scorch - Small Rotor, 121 C. for 30 mins | | | | | | | | | | | |
| Initial Peak after Preheat [MU] | 96 | 120 | 133 | 94 | 96 | 109 | 96 | 149 | 132 | 107 | unable to test |
| Min Mooney = ML [MU] | 81 | 77 | 76 | 57 | 55 | 74 | 74 | 75 | 73 | 56 | unable to test |
| T3 [min] | 27 | 4 | 4 | 4.4 | 3.6 | 5 | | 4 | 4 | 3.6 | unable to test |
| T5 [min] | | 17 | 5 | | | 6 | | 5 | 4 | 4 | unable to test |
| T10 [min] | | 22 | 17 | | | 9 | | 7 | 18 | 5.1 | unable to test |
| T18 [min] | | | | | | 13 | | 10 | 22 | 6.8 | unable to test |
| T35 [min] | | | | | | 16 | | 13 | 27 | 11.1 | unable to test |
| Final Viscosity [MU] | 85 | 91 | 94 | 59.4 | 58.6 | 110 | 71 | 110 | 108 | 91.3 | unable to test |
| MDR 20 minutes, 199° C., arc 0.5° | | | | | | | | | | | |
| ML [dNm] | 3.64 | 2.67 | 3.18 | 2.01 | 2.18 | 4.92 | 3.08 | 6.26 | 3.93 | 4.45 | unable to test |
| MH [dNm] | 16.39 | 14.1 | 14.98 | 8.14 | 9.27 | 17.79 | 16.93 | 16.21 | 18.07 | 9.15 | unable to test |

TABLE 2-continued

| | E1 | E2 | E3 | E4 | E5 | C1 | C2 | C3 | C4 | C5 | C6 |
|---|---|---|---|---|---|---|---|---|---|---|---|
| Ts2 [min] | 0.67 | 0.68 | 0.66 | 1.74 | 1.92 | 0.4 | 2.49 | 0.33 | 0.55 | 1.21 | unable to test |
| T90 [min] | 3.11 | 3.63 | 4.09 | 4.95 | 8.78 | 9.85 | 11.89 | 5.83 | 7.76 | 4.39 | unable to test |
| INITIAL O-ring Tensile 500 mm/min | | | | | | | | | | | |
| Mean Elongation at Break* [%] | 169 | 157 | 177 | 292 | 331 | 121 | 150 | | | 276 | unable to test |
| Mean Stress at Break* [MPa] | 15.91 | 14.76 | 17.56 | 3.11 | 4.35 | 10.89 | 13.58 | | | 4.32 | unable to test |
| Mean M100%* [MPa] | 6.67 | 6.65 | 6.96 | 0.84 | 0.84 | 7.58 | 7.09 | | | 0.91 | unable to test |
| Compression Set O-ring at 25% Comp in air at 204° C. for 70 hrs | | | | | | | | | | | |
| Compression set [%] | 13 | | 13 | 10 | 14 | 10 | 22 | | | 9 | unable to test |

The compositions using B-1, B-4 and B-5 reduced the scorch significantly and hence made processing of parts easy. The parts thus produced also showed comparable or better tensile and compression set.

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A compound comprising:

(A) one or more fluoroelastomers comprising copolymerized units of:

(1) one or more fluorinated olefins;

(2) one or more olefin co-monomers different from the one or more fluorinated olefins (1) and selected from the group consisting of fluorovinyl ethers, hydrocarbon olefins, and combinations of two or more fluorovinyl ethers or hydrocarbon olefins; and (3) one or more cure site monomers selected from the group consisting of nitrile-containing fluorinated olefins and nitrile-containing fluorinated vinyl ethers; and (B) a curing agent comprising an amidocarboxylic acid and an amidine-containing molecule, or an amidocarboxylic acid salt of an amidine-containing molecule.

2. The compound of claim 1 comprising 0.1 to 10 phr of the curing agent B, based on the total weight of the one or more fluoroelastomers A.

3. The compound of claim 1, wherein the amidine-containing molecule is selected from the group consisting of molecules having the structural formula (XI), (XII) or (XIII):

(XI)

(XII)

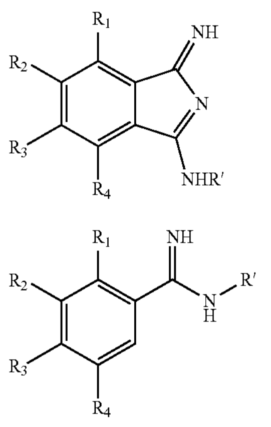

-continued (XIII)

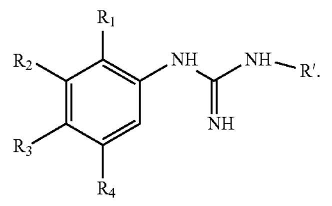

wherein each of $R_1$, $R_2$, $R_3$, and $R_4$ is selected from the group consisting of H, halogen atom, $C_1$ to $C_4$ alkyl groups in which the alkyl group is linear, branched, or cyclic; at least two of $R_1$, $R_2$, $R_3$, and $R_4$ can form a ring with saturated or unsaturated hydrocarbon; OR'; and aromatic groups; and R' is selected from the group consisting of $C_1$ to $C_4$ alkyl groups in which the alkyl group is linear, branched, or cyclic; and substituted or unsubstituted phenyl groups.

4. The compound of claim 3, wherein the molecule of formula (XI) is selected from the group consisting of 1,3-diiminoisoindoline, benzamidine, and diphenyl guanidine.

5. The compound of claim 1, wherein the curing agent comprises an amidocarboxylic acid of formula (XIV) or a carboxylate salt of the amidocarboxylic acid of formula (XIV):

(XIV)

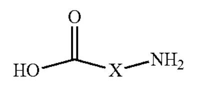

X=CO, —CH(R")CO, —CH(R")CH(R")CO, —C(R")=C(R")CO

R"=H or Me.

6. The compound of claim 5, wherein the amidocarboxylic acid is oxamic acid and the amidocarboxylate salt is an oxamic acid salt.

7. Compound of claim 1, wherein fluorinated olefin is selected from the group consisting of tetrafluoroethylene, 1,1-difluoroethylene, and mixtures of these.

8. The compound of claim 1, wherein the fluorovinyl ether is selected from the group consisting of perfluoro(methyl vinyl) ether and perfluoro (propyl vinyl) ether.

9. The compound of claim 1, wherein the viscosity of the compound increases by less than 10 Mooney units when the compound is heated at 121° C. for 10 minutes.

10. The compound of claim 1, wherein the viscosity of the compound increases by less than 2 N-dm upon heating at 199° C. for 30 sec.

11. An article comprising the compound of claim 1 or a product of curing the compound of claim 1.

12. The article of claim 11, wherein the compression set, as measured after 25% compression for 70 hours in air at 204° C., according to method ASTM D395B, is less than 15 percent.

13. A process comprising the step of:

curing a fluoroelastomer with at least one curing agent, said curing agent comprising an amidocarboxylic acid and an amidine-containing molecule, or an amidocarboxylic acid salt of an amidine-containing molecule.

14. The process of claim 13, comprising an amidocarboxylic acid of formula (XIV) or a carboxylate salt of the amidocarboxylic acid of formula (XIV):

(XIV)

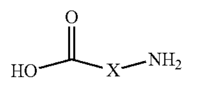

X=CO, —CH(R")CO, —CH(R")CH(R")CO, —C(R")=C(R")CO

R"=H or Me.

15. The process of claim 14, wherein the amidocarboxylic acid is oxamic acid and the amidocarboxylate salt is an oxamic acid salt.

16. The process of claim 13, wherein the amidine-containing molecule is selected from the group consisting of molecules having the structural formula (XI), (XII) or (XIII):

(XI)

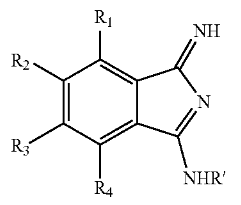

-continued (XII)

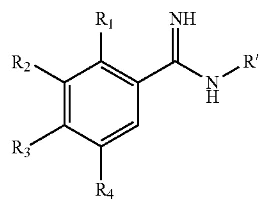

(XIII)

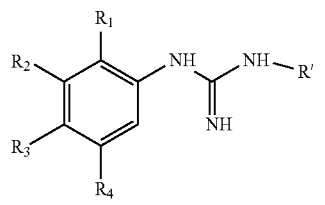

wherein each of $R_1$, $R_2$, $R_3$, and $R_4$ is selected from the group consisting of H, halogen atom, $C_1$ to $C_4$ alkyl groups in which the alkyl group is linear, branched, or cyclic; at least two of $R_1$, $R_2$, $R_3$, and $R_4$ can form a ring with saturated or unsaturated hydrocarbon; OR'; and aromatic groups; and R' is selected from the group consisting of $C_1$ to $C_4$ alkyl groups in which the alkyl group is linear, branched, or cyclic; and substituted or unsubstituted phenyl groups.

17. The process of claim 16, wherein the amidine-containing molecule is selected from the group consisting of 1,3-diiminoisoindoline, benzamidine, and diphenylguanidine.

18. A compound that is the product of the process of claim 13, wherein the viscosity of the compound increases by less than 10 Mooney units when the product is heated at 121° C. for 10 minutes.

19. A compound that is the product of the process of claim 13, wherein the viscosity of the compound increases by less than 2 N-dm upon heating at 199° C. for 30 sec.

20. An article that is a product of the process of claim 13.

* * * * *